US012262193B2

(12) United States Patent
Benattar

(10) Patent No.: US 12,262,193 B2
(45) Date of Patent: *Mar. 25, 2025

(54) AUDIO SOURCE SPATIALIZATION RELATIVE TO ORIENTATION SENSOR AND OUTPUT

(71) Applicant: STAGES LLC, Cranbury, NJ (US)

(72) Inventor: Benjamin D. Benattar, Cranbury, NJ (US)

(73) Assignee: STAGES LLC, Cranbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,285

(22) Filed: Apr. 12, 2022

(65) Prior Publication Data

US 2022/0240045 A1 Jul. 28, 2022

Related U.S. Application Data

(63) Continuation of application No. 15/946,647, filed on Apr. 5, 2018, now Pat. No. 11,330,388, which is a (Continued)

(51) Int. Cl.

*H04S 7/00* (2006.01)
*H04R 1/40* (2006.01)
(Continued)

(52) U.S. Cl.

CPC .............. *H04S 7/303* (2013.01); *H04R 1/406* (2013.01); *H04R 3/005* (2013.01); *H04R 5/027* (2013.01);
(Continued)

(58) Field of Classification Search

CPC ........ H04R 1/406; H04R 3/005; H04R 5/027; H04R 5/033; H04R 2430/20; H04S 7/304; H04S 2400/15; H04S 2420/01
(Continued)

(56) References Cited

U.S. PATENT DOCUMENTS 3,806,919 A 4/1974 Comey
4,776,044 A 10/1988 Makins
(Continued)

FOREIGN PATENT DOCUMENTS

AU 2002300314 B2 1/2009
AU 2003236382 B2 2/2011
(Continued)

OTHER PUBLICATIONS

Albing, Brad, Noise-Reducing Headphones Hide Analog Heart, Jan. 24, 2013, retrieved from http://www.planetanalog.com/author.asp?section.sub.--id=385&doc.sub.--id=- 558728, USA on Feb. 5, 2015.
(Continued)

*Primary Examiner* — Disler Paul

(74) *Attorney, Agent, or Firm* — UNGERMAN IP PLLC; Mark E. Ungerman

(57) ABSTRACT

An audio customization system operates to enhance a user's audio environment. A user may wear headphones and specify what portion the ambient audio and/or source audio will be transmitted to the headphones or the personal speaker system. The audio signal may be enhanced by application of a spatialized transformation using a spatialization engine such as head-related transfer functions so that at least a portion of the audio presented to the personal speaker system will appear to originate from a particular direction. The direction may be modified in response to movement of the personal speaker system.

8 Claims, 4 Drawing Sheets

Related U.S. Application Data continuation of application No. 15/355,766, filed on Nov. 18, 2016, now Pat. No. 9,980,075.

(51) Int. Cl.
*H04R 3/00* (2006.01)
*H04R 5/027* (2006.01)
*H04R 5/033* (2006.01)

(52) U.S. Cl.
CPC ........ *H04R 5/033* (2013.01); *H04R 2201/401* (2013.01); *H04R 2430/20* (2013.01); *H04S 7/304* (2013.01); *H04S 2400/15* (2013.01); *H04S 2420/01* (2013.01)

(58) Field of Classification Search
USPC .......................................... 381/91–92, 26, 74
See application file for complete search history.

(56) References Cited

U.S. PATENT DOCUMENTS

| | | | |
|---|---|---|---|
| 5,432,858 | A | 7/1995 | Clair, Jr. et al. |
| 5,581,620 | A | 12/1996 | Brandstein et al. |
| 5,619,582 | A | 4/1997 | Oltman et al. |
| 5,638,343 | A | 6/1997 | Ticknor |
| 5,668,884 | A | 9/1997 | Clair, Jr. et al. |
| 5,737,431 | A | 4/1998 | Brandstein et al. |
| 5,778,082 | A | 7/1998 | Chu et al. |
| 5,822,440 | A | 10/1998 | Oltman et al. |
| 6,259,795 | B1 * | 7/2001 | McGrath ................ H04S 7/304 381/310 |
| 6,462,808 | B2 | 10/2002 | Paritsky et al. |
| RE38,405 | E | 1/2004 | Clair, Jr. et al. |
| 6,959,075 | B2 | 10/2005 | Cutaia et al. |
| 7,110,552 | B1 | 9/2006 | Saliterman |
| D552,077 | S | 10/2007 | Brunner et al. |
| 7,349,547 | B1 | 3/2008 | Isvan |
| 7,415,117 | B2 | 8/2008 | Tashev et al. |
| 7,475,434 | B2 | 1/2009 | Ambuske et al. |
| 7,492,907 | B2 | 2/2009 | Klayman et al. |
| 7,583,808 | B2 | 9/2009 | Smaragdis et al. |
| 7,620,409 | B2 | 11/2009 | Budampati et al. |
| 7,631,305 | B2 | 12/2009 | Rong et al. |
| 7,817,805 | B1 | 10/2010 | Griffin |
| 7,848,512 | B2 | 12/2010 | Eldracher |
| 7,970,150 | B2 | 6/2011 | Oxford |
| D641,725 | S | 7/2011 | Chong et al. |
| 7,995,770 | B1 | 8/2011 | Simon |
| 8,064,607 | B2 | 11/2011 | Monceaux et al. |
| 8,150,054 | B2 | 4/2012 | Andrea et al. |
| 8,155,346 | B2 | 4/2012 | Yoshizawa et al. |
| 8,160,265 | B2 | 4/2012 | Mao et al. |
| 8,194,873 | B2 | 6/2012 | Pan et al. |
| 8,290,174 | B1 | 10/2012 | Simon |
| 8,379,874 | B1 | 2/2013 | Simon |
| 8,483,396 | B2 | 7/2013 | Amadu et al. |
| 8,521,316 | B2 | 8/2013 | Louboutin |
| 8,542,843 | B2 | 9/2013 | Andrea et al. |
| 8,566,887 | B2 | 10/2013 | Hasek et al. |
| 8,577,053 | B1 | 11/2013 | Simon |
| 8,612,187 | B2 | 12/2013 | Amadu |
| 8,768,496 | B2 | 7/2014 | Katz et al. |
| 8,873,767 | B2 | 10/2014 | Regler |
| 8,917,506 | B2 | 12/2014 | Diebel et al. |
| 8,934,635 | B2 | 1/2015 | Esnault et al. |
| 8,949,958 | B1 | 2/2015 | Dixon |
| 9,087,506 | B1 | 7/2015 | Kraft et al. |
| 9,111,529 | B2 | 8/2015 | Amadu et al. |
| 9,112,464 | B2 | 8/2015 | Amadu et al. |
| 9,113,264 | B2 | 8/2015 | Frater |
| 9,131,308 | B2 | 9/2015 | Kraft et al. |
| 9,226,088 | B2 | 12/2015 | Pandey et al. |
| 9,271,103 | B2 | 2/2016 | Wells |
| 9,538,289 | B2 * | 1/2017 | Karkkainen ........ G10L 21/0216 |
| 9,761,055 | B2 * | 9/2017 | Miller ..................... H04S 7/304 |
| 10,089,063 | B2 | 10/2018 | Shivappa et al. |
| 10,257,637 | B2 * | 4/2019 | Di Censo ............... H04R 1/406 |
| 10,645,518 | B2 * | 5/2020 | Eronen ..................... H04S 5/00 |
| 10,979,843 | B2 * | 4/2021 | Thagadur Shivappa .................... H04S 7/303 |
| 11,120,818 | B2 * | 9/2021 | Magnusson .............. H03G 1/02 |
| 2002/0122137 | A1 | 9/2002 | Chen et al. |
| 2003/0161485 | A1 | 8/2003 | Smith |
| 2005/0004985 | A1 | 1/2005 | Stochosky |
| 2006/0056638 | A1 | 3/2006 | Schobben |
| 2007/0030986 | A1 | 2/2007 | McArthur et al. |
| 2008/0174665 | A1 | 7/2008 | Enstad et al. |
| 2009/0010443 | A1 | 1/2009 | Ahnert et al. |
| 2010/0034396 | A1 | 2/2010 | Wollmershauser et al. |
| 2010/0141153 | A1 | 6/2010 | Recker et al. |
| 2010/0239105 | A1 | 9/2010 | Pan |
| 2010/0290636 | A1 | 11/2010 | Mao et al. |
| 2011/0025912 | A1 | 2/2011 | Regler |
| 2011/0081024 | A1 | 4/2011 | Soulodre |
| 2012/0020502 | A1 | 1/2012 | Adams |
| 2012/0087507 | A1 | 4/2012 | Meyer |
| 2012/0224715 | A1 | 9/2012 | Kikkeri |
| 2012/0259628 | A1 | 10/2012 | Siotis |
| 2012/0270231 | A1 | 10/2012 | Smith et al. |
| 2012/0330653 | A1 | 12/2012 | Lissek et al. |
| 2013/0121505 | A1 | 5/2013 | Duraiswami et al. |
| 2013/0305297 | A1 | 11/2013 | Jabara et al. |
| 2014/0044275 | A1 | 2/2014 | Goldstein et al. |
| 2014/0093093 | A1 | 4/2014 | Dusan et al. |
| 2014/0157325 | A1 | 6/2014 | Jabara et al. |
| 2014/0184386 | A1 | 7/2014 | Regler et al. |
| 2014/0200054 | A1 | 7/2014 | Fraden |
| 2014/0233181 | A1 | 8/2014 | Harms et al. |
| 2014/0270200 | A1 | 9/2014 | Usher et al. |
| 2014/0270231 | A1 | 9/2014 | Dusan et al. |
| 2014/0301568 | A1 | 10/2014 | Amadu et al. |
| 2014/0359444 | A1 | 12/2014 | Greenberg-Sanders et al. |
| 2015/0054913 | A1 | 2/2015 | Annau et al. |
| 2015/0055937 | A1 | 2/2015 | Van Hoff et al. |
| 2015/0058102 | A1 | 2/2015 | Christensen et al. |
| 2015/0095026 | A1 | 4/2015 | Bisani et al. |
| 2015/0189621 | A1 | 7/2015 | Bekiares et al. |
| 2015/0206524 | A1 | 7/2015 | Kraft et al. |
| 2015/0208170 | A1 | 7/2015 | Kraft et al. |
| 2015/0215701 | A1 | 7/2015 | Usher |
| 2015/0234156 | A1 | 8/2015 | Rondinelli et al. |
| 2015/0242519 | A1 | 8/2015 | Alsina et al. |
| 2015/0312671 | A1 | 10/2015 | Wiggins et al. |
| 2015/0312677 | A1 | 10/2015 | Kraft et al. |
| 2015/0348580 | A1 | 12/2015 | Hoff et al. |
| 2015/0350768 | A1 | 12/2015 | Terpstra |
| 2015/0355880 | A1 | 12/2015 | Kraft et al. |
| 2015/0373474 | A1 | 12/2015 | Kraft et al. |
| 2015/0382106 | A1 | 12/2015 | Kraft et al. |
| 2016/0055861 | A1 | 2/2016 | Kraft et al. |
| 2016/0057526 | A1 | 2/2016 | Jaffe et al. |
| 2016/0300584 | A1 | 10/2016 | Pandey et al. |
| 2017/0295446 | A1 | 10/2017 | Shivappa |
| 2017/0374455 | A1 * | 12/2017 | Shastry ................ H04R 1/1008 |
| 2018/0046431 | A1 | 2/2018 | Shivappa et al. |
| 2018/0160211 | A1 | 6/2018 | Kirsch et al. |
| 2018/0184226 | A1 | 6/2018 | Giannuzzi |
| 2018/0206054 | A1 | 7/2018 | Laitinen et al. |
| 2018/0270571 | A1 * | 9/2018 | Di Censo ............. G10K 11/175 |
| 2019/0104371 | A1 | 4/2019 | Ballande et al. |

FOREIGN PATENT DOCUMENTS

| | | | |
|---|---|---|---|
| CN | 103229160 | A | 7/2013 |
| DE | 102004025533 | A1 | 12/2005 |
| EP | 0653144 | B1 | 12/1998 |
| JP | 2009188641 | A | 8/2009 |
| WO | 2005032209 | A2 | 4/2005 |
| WO | 2012048299 | A1 | 4/2012 |
| WO | 2014096861 | A2 | 6/2014 |

(56) References Cited

OTHER PUBLICATIONS

Andrea Electronics Corporation, Digital Super Directional Array, DSDA Far-Field Microphone Technology, 2 pages, Melville, NY, USA.
AustriaMicrosystems AG, AS3421/22 Low Power Ambient Noise-Cancelling Speaker Driver DataSheet, 61 pages, 1997-2013, Austria.
AustriaMicrosystems AG-AMS AG, AS3501 AS3502 Low Power Ambient Noise-Cancelling Speaker Driver DataSheet, 46 pages, 1997-2009, Austria.
Baldwin, Richard G., Adaptive Noise Cancellation Using Java, Java Programing Notes #2360, Apr. 18, 2006, retrieved from http://www.developer.com/java/other/article.php/3599661/Adaptive-Noise-Ca- ncellation-Using-Java.htm, USA on Feb. 5, 2015.
Chowdhry, Amit, 26 Best Noise Cancelling Headphones, Pulse2.0 Technology News Since 2006, Nov. 28, 2012, retrieved from http://pulse2.com/2012/11/28/best-noise canceling-headphones/, USA on Feb. 5, 2015.
CNET TV, Monoprice's Noise Cancelling Headphone tries to silence critics,—You Tube, http://scienceheap.com/?rvq, https://www.youtube.com/watch?v=h8.sub.--PDtXQu58#t=89, Apr. 10, 2013, USA.
Conexant, Conexant AudioSmart Voice & Speech Processing White Paper, Feb. 12, 2014, pp. 1-19.
Dualta, Currie, Shedding Some Light on Voice Authentication, SANS Institute InfoSec Reading Room, 2003, 17 pages, USA.
Elliott, S.J., Nelson, P.A., Active Noise Control—Low-frequency techniques for suppressing acoustic noise leap forward with signal processing, IEEE Signal Processing Magazine, Oct. 1993, 24 pages, USA.
FMA Solutions, Inc., Best Noise Canceling Earphones, Westone Noise Canceling Earphones, 2014, earphonesolutions.com/coofsoiseaan.html, Orlando, FL, USA.
FrankFSP, ConcertTronix! The Revolutionary New Way to Attend, Listen and Record Live Concerts with Your Mobile Device!, Sep. 12, 2012, USA.
Geronazzo, Michelle; Bedin, Alberto; Brayda, Luca; Campus, Claudio; Avanzini, Federico. Interactive spatial sonification for non-visual exploration of virtual maps, Int. J. Human-Computer Studies, 85(2016) 4-15, 2015 Elsevier Ltd.
Haynes, Toby, A Primer on Digital Beamforming, Mar. 26, 1988, www.spectrumsignal.com, 15 pages, British Columbia, Canada.
Wikipedia Contributors "Head-related transfer function". The Free Encyclopedia, Wikipedia, retrieved from https://en.wikipedia.org/wiki/Head-related_transfer_function on Sep. 28, 2016.
Jezierny, Michael; Keller, Brenton; Lee, Kyung Yul, Digital Active Noise Cancelling Headphones, School of Engineering and Applied Science, Electrical and Systems Engineering Department, Washington University in St. Louis, May 2010, 25 pages, USA.
Jiang, Wentao, "Sound of silence": a secure indoor wireless ultrasonic communication system, School of Engineering—Electrical & Electronic Engineering, UCC, 2014, retrieved from http://publish.ucc.ie/boolean/pdf/2014/00/09-jiang-2014-00-en.pdf on Nov. 24, 2015.
Kendall, Gary S., A 3-D Sound Primer: Directional Hearing and Stereo Reproduction, Computer Music Journal, vol. 19, No. 4 (Winter, 1995), pp. 23-46.
Kuo, S.M., Panahi, I., Chung, K.M., Horner, T., Nadeski, M., Chyan, J., Design of Active Noise Control Systems with the TMS320 Family Application Report, Texas Instruments Digital Signal Processing Solutions, 1996, 171 pages, USA.
Kuo, Sen M. and Morgan, Dennis R., Active Noise Control: A Tutorial Review, Proceedings of the IEEE, vol. 87, No. 6, Jun. 1999, pp. 943-973, USA.
Lavalle, S.M.; Yershova, A.; Katseve, M.; Antonov, M. (2014). Head Tracking for the Oculus Rift, Proceedings of the IEEE International Conference on Robotics and Automation, p. 187-194.
Lu, Yan-Chen; Cooke, Martin, Motion strategies for binaural localisation of speech sources in azimuth and distance by artificial listeners, Speech Comm. (2010) , Jun. 12, 2010, ScienceDirect.
Mannion, Patrick. Teardown: Analog Rules Over Digital in Noise-Canceling Headphones, EDN Network, Jan. 11, 2013, 3 pages, USA.
Maxim, Audio Design Guide, 12th Edition, Dec. 2009, 20 pages, USA.
MiniDSP Ltd., Digital Crossover Basics, www.minidsp.com/, 2009-2014, 4 pages, Hong Kong.
Parra, Lucas; Fancourt, Craig, An Adaptive Beamforming Perspective on Convolutive Blind Source Separation, Samoff Corporation, Noise Reduction in Speech Applications, Ed. G. Davis, CRC Press, 2002, Princeton, NJ, pp. 1-18.
Priyantha, N.B.; Chakraborty, A.; Balakrishan, H., The Cricket Location-Support System, 2000, MIT Laboratory for Computer Science, Cambridge, Massachusetts, U.S.
Ruckus Wireless, Inc., Best Practice Design Guide: Deploying Very High Density Wi-Fi—Design and Configuration Guide for Stadiums, 2012, http://c541678.r78.cf2.rackcdn.com/appnotes/bpg-highdensity.pdf, 2012, USA.
Singh, Aarti, Adaptive Noise Cancellation, Dept. of Electronics & Communication, Netaji Subhas Institute of Technology, 2001, 52 pages, India.
STMicroelectrics, STA311B Multichannel digital audio processor with FFX Datasheet, Oct. 2013, 102 pages, USA.
STMicroelectronics, STA308A Multi-channel digital audio processor with DDX Datasheet, Jul. 2007, USA.
Wassp, WMB-3230, Operator manual, Version V1.1a, Jun. 2013, pp. 1-74.
Zaunschirm, Markus and Zotter, Franz, Measurement-Based Modal Beamforming Using Planar Circular Microphone Arrays, Proc. of the EAA Joint Symposium on Auralization and Ambisonics, Apr. 3-5, 2014, pp. 75-80, Berlin, Germany.
Stefania Repetto and Andrea Trucco, Signing Superdirective Microphone Arrays with a Frequency-Invariant Beam Pattern, IEEE Sensors Journal, Jun. 2006, pp. 737-747, vol. 6, No. 3, Italy.

* cited by examiner

AUDIO SOURCE SPATIALIZATION RELATIVE TO ORIENTATION SENSOR AND OUTPUT

CROSS REFERENCE TO RELATED APPLICATIONS

This application is a continuation of U.S. application Ser. No. 15/946,647 filed Apr. 5, 2018, which is a continuation and claims priority to U.S. application Ser. No. 15/355,766 filed Nov. 18, 2016, issued as U.S. Pat. No. 9,980,075 on May 22, 2018.

BACKGROUND OF THE INVENTION

1. Field of the Invention

This invention relates to an audio processing system and more particularly to an audio processing system that spatializes audio for output.

2. Description of the Related Technology

WO 2016/090342 A2, published Jun. 9, 2016, the disclosure of which is expressly incorporated herein and which was made by the inventor of subject matter described herein, shows an adaptive audio spatialization system having an audio sensor array rigidly mounted to a personal speaker.

It is known to use microphone arrays and beamforming technology in order to locate and isolate an audio source. Personal audio is typically delivered to a user by a personal speaker(s) such as headphones or earphones. Headphones are a pair of small speakers that are designed to be held in place close to a user's ears. They may be electroacoustic transducers which convert an electrical signal to a corresponding sound in the user's ear. Headphones are designed to allow a single user to listen to an audio source privately, in contrast to a loudspeaker which emits sound into the open air, allowing anyone nearby to listen. Earbuds or earphones are in-ear versions of headphones.

A sensitive transducer element of a microphone is called its element or capsule. Except in thermophone based microphones, sound is first converted to mechanical motion [by] a diaphragm, the motion of which is then converted to an electrical signal. A complete microphone also includes a housing, some means of bringing the signal from the element to other equipment, and often an electronic circuit to adapt the output of the capsule to the equipment being driven. A wireless microphone contains a radio transmitter.

The MEMS (MicroElectrical-Mechanical System) microphone is also called a microphone chip or silicon microphone. A pressure-sensitive diaphragm is etched directly into a silicon wafer by MEMS processing techniques, and is usually accompanied with integrated preamplifier. Most MEMS microphones are variants of the condenser microphone design. Digital MEMS microphones have built in analog-to-digital converter (ADC) circuits on the same CMOS chip making the chip a digital microphone and so more readily integrated with modern digital products. Major manufacturers producing MEMS silicon microphones are Wolfson Microelectronics (WM7xxx), Analog Devices, Akustica (AKU200x), Infineon (SMM310 product), Knowles Electronics, Memstech (MSMx), NXP Semiconductors, Sonion MEMS, Vesper, AAC Acoustic Technologies, and Omron.

A microphone's directionality or polar pattern indicates how sensitive it is to sounds arriving at different angles about its central axis. The polar pattern represents the locus of points that produce the same signal level output in the microphone if a given sound pressure level (SPL) is generated from that point. How the physical body of the microphone is oriented relative to the diagrams depends on the microphone design. Large-membrane microphones are often known as "side fire" or "side address" on the basis of the sideward orientation of their directionality. Small diaphragm microphones are commonly known as "end fire" or "top/end address" on the basis of the orientation of their directionality.

Some microphone designs combine several principles in creating the desired polar pattern. This ranges from shielding (meaning diffraction/dissipation/absorption) by the housing itself to electronically combining dual membranes.

An omni-directional (or non-directional) microphone's response is generally considered to be a perfect sphere in three dimensions. I n the real world, this is not the case. As with directional microphones, the polar pattern for an "omni-directional" microphone is a function of frequency. The body of the microphone is not infinitely small and, as a consequence, it tends to get in its own way with respect to sounds arriving from the rear, causing a slight flattening of the polar response. This flattening increases as the diameter of the microphone (assuming it's cylindrical) reaches the wavelength of the frequency in question.

A unidirectional microphone is sensitive to sounds from only one direction

A noise-canceling microphone is a highly directional design intended for noisy environments. One such use is in aircraft cockpits where they are normally installed as boom microphones on headsets. Another use is in live event support on loud concert stages for vocalists involved with live performances. Many noise-canceling microphones combine signals received from two diaphragms that are in opposite electrical polarity or are processed electronically. In dual diaphragm designs, the main diaphragm is mounted closest to the intended source and the second is positioned farther away from the source so that it can pick up environmental sounds to be subtracted from the main diaphragm's signal. After the two signals have been combined, sounds other than the intended source are greatly reduced, substantially increasing intelligibility. Other noise-canceling designs use one diaphragm that is affected by ports open to the sides and rear of the microphone.

Sensitivity indicates how well the microphone converts acoustic pressure to output voltage. A high sensitivity microphone creates more voltage and so needs less amplification at the mixer or recording device. This is a practical concern but is not directly an indication of the microphone's quality, and in fact the term sensitivity is something of a misnomer, "transduction gain" being perhaps more meaningful, (or just "output level") because true sensitivity is generally set by the noise floor, and too much "sensitivity" in terms of output level compromises the clipping level.

A microphone array is any number of microphones operating in tandem. Microphone arrays may be used in systems for extracting voice input from ambient noise (notably telephones, speech recognition systems, and hearing aids), surround sound and related technologies, binaural recording, locating objects by sound: acoustic source localization, e.g., military use to locate the source(s) of artillery fire, aircraft location and tracking.

Typically, an array is made up of omni-directional microphones, directional microphones, or a mix of omni-directional and directional microphones distributed about the perimeter of a space, linked to a computer that records and interprets the results into a coherent form. Arrays may also have one or more microphones in an interior area encompassed by the perimeter. Arrays may also be formed using numbers of very closely spaced microphones. Given a fixed physical relationship in space between the different individual microphone transducer array elements, simultaneous DSP (digital signal processor) processing of the signals from each of the individual microphone array elements can create one or more "virtual" microphones.

Beamforming or spatial filtering is a signal processing technique used in sensor arrays for directional signal transmission or reception. This is achieved by combining elements in a phased array in such a way that signals at particular angles experience constructive interference while others experience destructive interference. A phased array is an array of antennas, microphones, or other sensors in which the relative phases of respective signals are set in such a way that the effective radiation pattern is reinforced in a desired direction and suppressed in undesired directions. The phase relationship may be adjusted for beam steering. Beamforming can be used at both the transmitting and receiving ends in order to achieve spatial selectivity. The improvement compared with omni-directional reception/transmission is known as the receive/transmit gain (or loss).

Adaptive beamforming is used to detect and estimate a signal-of-interest at the output of a sensor array by means of optimal (e.g., least-squares) spatial filtering and interference rejection.

To change the directionality of the array when transmitting, a beamformer controls the phase and relative amplitude of the signal at each transmitter, in order to create a pattern of constructive and destructive interference in the wavefront. When receiving, information from different sensors is combined in a way where the expected pattern of radiation is preferentially observed.

With narrow-band systems the time delay is equivalent to a "phase shift", so in the case of a sensor array, each sensor output is shifted a slightly different amount. This is called a phased array. A narrow band system, typical of radars or wide microphone arrays, is one where the bandwidth is only a small fraction of the center frequency. With wide band systems this approximation no longer holds, which is typical in sonars.

In the receive beamformer the signal from each sensor may be amplified by a different "weight." Different weighting patterns (e.g., Dolph-Chebyshev) can be used to achieve the desired sensitivity patterns. A main lobe is produced together with nulls and side lobes. As well as controlling the main lobe width (the beam) and the side lobe levels, the position of a null can be controlled. This is useful to ignore noise or jammers in one particular direction, while listening for events in other directions. A similar result can be obtained on transmission.

Beamforming techniques can be broadly divided into two categories:

a. conventional (fixed or switched beam) beamformers
b. adaptive beamformers or phased array
   i. desired signal maximization mode
   ii. interference signal minimization or cancellation mode Conventional beamformers use a fixed set of weightings and time-delays (or phasings) to combine the signals from the sensors in the array, primarily using only information about the location of the sensors in space and the wave directions of interest. In contrast, adaptive beamforming techniques generally combine this information with properties of the signals actually received by the array, typically to improve rejection of unwanted signals from other directions. This process may be carried out in either the time or the frequency domain.

As the name indicates, an adaptive beamformer is able to automatically adapt its response to different situations. Some criterion has to be set up to allow the adaption to proceed such as minimizing the total noise output. Because of the variation of noise with frequency, in wide band systems it may be desirable to carry out the process in the frequency domain.

Beamforming can be computationally intensive.

Beamforming can be used to try to extract sound sources in a room, such as multiple speakers in the cocktail party problem. This requires the locations of the speakers to be known in advance, for example by using the time of arrival from the sources to mics in the array, and inferring the locations from the distances.

A Primer on Digital Beamforming by Toby Haynes, Mar. 26, 1998 http://www.spectrumsignal.com/publications/beamform_primer.pdf describes beam forming technology.

According to U.S. Pat. No. 5,581,620, the disclosure of which is incorporated by reference herein, many communication systems, such as radar systems, sonar systems and microphone arrays, use beamforming to enhance the reception of signals. In contrast to conventional communication systems that do not discriminate between signals based on the position of the signal source, beamforming systems are characterized by the capability of enhancing the reception of signals generated from sources at specific locations relative to the system.

Generally, beamforming systems include an array of spatially distributed sensor elements, such as antennas, sonar phones or microphones, and a data processing system for combining signals detected by the array. The data processor combines the signals to enhance the reception of signals from sources located at select locations relative to the sensor elements. Essentially, the data processor "aims" the sensor array in the direction of the signal source. For example, a linear microphone array uses two or more microphones to pick up the voice of a talker. Because one microphone is closer to the talker than the other microphone, there is a slight time delay between the two microphones. The data processor adds a time delay to the nearest microphone to coordinate these two microphones. By compensating for this time delay, the beamforming system enhances the reception of signals from the direction of the talker, and essentially aims the microphones at the talker.

A beamforming apparatus may connect to an array of sensors, e.g. microphones that can detect signals generated from a signal source, such as the voice of a talker. The sensors can be spatially distributed in a linear, a two-dimensional array or a three-dimensional array, with a uniform or non-uniform spacing between sensors. A linear array is useful for an application where the sensor array is mounted on a wall or a podium talker is then free to move about a half-plane with an edge defined by the location of the array. Each sensor detects the voice audio signals of the talker and generates electrical response signals that represent these audio signals. An adaptive beamforming apparatus provides a signal processor that can dynamically determine the relative time delay between each of the audio signals detected by the sensors. Further, a signal processor may include a phase alignment element that uses the time delays to align the frequency components of the audio signals. The signal processor has a summation element that adds together the aligned audio signals to increase the quality of the desired audio source while simultaneously attenuating sources having different delays relative to the sensor array. Because the relative time delays for a signal relate to the position of the signal source relative to the sensor array, the beamforming apparatus provides, in one aspect, a system that "aims" the sensor array at the talker to enhance the reception of signals generated at the location of the talker and to diminish the energy of signals generated at locations different from that of the desired talker's location. The practical application of a linear array is limited to situations which are either in a half plane or where knowledge of the direction to the source in not critical. The addition of a third sensor that is not co-linear with the first two sensors is sufficient to define a planar direction, also known as azimuth. Three sensors do not provide sufficient information to determine elevation of a signal source. At least a fourth sensor, not co-planar with the first three sensors is required to obtain sufficient information to determine a location in a three dimensional space.

Although these systems work well if the position of the signal source is precisely known, the effectiveness of these systems drops off dramatically and computational resources required increases dramatically with slight errors in the estimated a priori information. For instance, in some systems with source-location schemes, it has been shown that the data processor must know the location of the source within a few centimeters to enhance the reception of signals. Therefore, these systems require precise knowledge of the position of the source, and precise knowledge of the position of the sensors. As a consequence, these systems require both that the sensor elements in the array have a known and static spatial distribution and that the signal source remains stationary relative to the sensor array. Furthermore, these beamforming systems require a first step for determining the talker position and a second step for aiming the sensor array based on the expected position of the talker.

A change in the position and orientation of the sensor can result in the aforementioned dramatic effects even if the talker is not moving due to the change in relative position and orientation due to movement of the arrays. Knowledge of any change in the location and orientation of the array can compensate for the increase in computational resources and decrease in effectiveness of the location determination and sound isolation.

U.S. Pat. No. 7,415,117 shows audio source location identification and isolation. Known systems rely on stationary microphone arrays.

A position sensor is any device that permits position measurement. It can either be an absolute position sensor or a relative one. Position sensors can be linear, angular, or multi-axis. Examples of position sensors include: capacitive transducer, capacitive displacement sensor, eddy-current sensor, ultrasonic sensor, grating sensor, Hall effect sensor, inductive non-contact position sensors, laser Doppler vibrometer (optical), linear variable differential transformer (LVDT), multi-axis displacement transducer, photodiode array, piezo-electric transducer (piezo-electric), potentiometer, proximity sensor (optical), rotary encoder (angular), seismic displacement pick-up, and string potentiometer (also known as string potentiometer, string encoder, cable position transducer). Inertial position sensors are common in modern electronic devices.

A gyroscope is a device used for measurement of angular velocity. Gyroscopes are available that can measure rotational velocity in 1, 2, or 3 directions. 3-axis gyroscopes are often implemented with a 3-axis accelerometer to provide a full 6 degree-of-freedom (DoF) motion tracking system. A gyroscopic sensor is a type of inertial position sensor that senses rate of rotational acceleration and may indicate roll, pitch, and yaw.

An accelerometer is another common inertial position sensor. An accelerometer may measure proper acceleration, which is the acceleration it experiences relative to freefall and is the acceleration felt by people and objects. Accelerometers are available that can measure acceleration in one, two, or three orthogonal axes. The acceleration measurement has a variety of uses. The sensor can be implemented in a system that detects velocity, position, shock, vibration, or the acceleration of gravity to determine orientation. An accelerometer having two orthogonal sensors is capable of sensing pitch and roll. This is useful in capturing head movements. A third orthogonal sensor may be added to obtain orientation in three dimensional space. This is appropriate for the detection of pen angles, etc. The sensing capabilities of an inertial position sensor can detect changes in six degrees of spatial measurement freedom by the addition of three orthogonal gyroscopes to a three axis accelerometer.

Magnetometers are devices that measure the strength and/or direction of a magnetic field. Because magnetic fields are defined by containing both a strength and direction (vector fields), magnetometers that measure just the strength or direction are called scalar magnetometers, while those that measure both are called vector magnetometers. Today, both scalar and vector magnetometers are commonly found in consumer electronics, such as tablets and cellular devices. In most cases, magnetometers are used to obtain directional information in three dimensions by being paired with accelerometers and gyroscopes. This device is called an inertial measurement unit "IMU" or a 9-axis position sensor.

A head-related transfer function (HRTF) is a response that characterizes how an ear receives a sound from a point in space; a pair of HRTFs for two ears can be used to synthesize a binaural sound that seems to come from a particular point in space. It is a transfer function, describing how a sound from a specific point will arrive at the ear (generally at the outer end of the auditory canal). Some consumer home entertainment products designed to reproduce surround sound from stereo (two-speaker) headphones use HRTFs. Some forms of HRTF-processing have also been included in computer software to simulate surround sound playback from loudspeakers.

Humans have just two ears, but can locate sounds in three dimensions—in range (distance), in direction above and below, in front and to the rear, as well as to either side. This is possible because the brain, inner ear and the external ears (pinna) work together to make inferences about location. This ability to localize sound sources may have developed in humans and ancestors as an evolutionary necessity, since the eyes can only see a fraction of the world around a viewer, and vision is hampered in darkness, while the ability to localize a sound source works in all directions, to varying accuracy, regardless of the surrounding light.

Humans estimate the location of a source by taking cues derived from one ear (monaural cues), and by comparing cues received at both ears (difference cues or binaural cues). Among the difference cues are time differences of arrival and intensity differences. The monaural cues come from the interaction between the sound source and the human anatomy, in which the original source sound is modified before it enters the ear canal for processing by the auditory system. These modifications encode the source location, and may be captured via an impulse response which relates the source location and the ear location. This impulse response is termed the head-related impulse response (HRIR). Convolution of an arbitrary source sound with the HRIR converts the sound to that which would have been heard by the listener if it had been played at the source location, with the listener's ear at the receiver location. HRIRs have been used to produce virtual surround sound.

The HRTF is the Fourier transform of HRIR. The HRTF is also sometimes known as the anatomical transfer function (ATF).

HRTFs for left and right ear (expressed above as HRIRs) describe the filtering of a sound source (x(t)) before it is perceived at the left and right ears as xL(t) and xR(t), respectively.

The HRTF can also be described as the modifications to a sound from a direction in free air to the sound as it arrives at the eardrum. These modifications include the shape of the listener's outer ear, the shape of the listener's head and body, the acoustic characteristics of the space in which the sound is played, and so on. All these characteristics will influence how (or whether) a listener can accurately tell what direction a sound is coming from. The associated mechanism varies between individuals, as their head and ear shapes differ.

HRTF describes how a given sound wave input (parameterized as frequency and source location) is filtered by the diffraction and reflection properties of the head, pinna, and torso, before the sound reaches the transduction machinery of the eardrum and inner ear (see auditory system). Biologically, the source-location-specific pre-filtering effects of these external structures aid in the neural determination of source location), particularly the determination of the source's elevation (see vertical sound localization).

Linear systems analysis defines the transfer function as the complex ratio between the output signal spectrum and the input signal spectrum as a function of frequency. Blauert (1974; cited in Blauert, 1981) initially defined the transfer function as the free-field transfer function (FFTF). Other terms include free-field to eardrum transfer function and the pressure transformation from the free-field to the eardrum. Less specific descriptions include the pinna transfer function, the outer ear transfer function, the pinna response, or directional transfer function (DTF).

The transfer function H(f) of any linear time-invariant system at frequency f is:

$$H(f)=\text{Output}(f)/\text{Input}(f)$$

One method used to obtain the HRTF from a given source location is therefore to measure the head-related impulse response (HRIR), h(t), at the ear drum for the impulse Δ(t) placed at the source. The HRTF H(f) is the Fourier transform of the HRIR h(t).

Even when measured for a "dummy head" of idealized geometry, HRTF are complicated functions of frequency and the three spatial variables. For distances greater than 1 m from the head, however, the HRTF can be said to attenuate inversely with range. It is this far field HRTF, H(f, θ, φ), that has most often been measured. At closer range, the difference in level observed between the ears can grow quite large, even in the low-frequency region within which negligible level differences are observed in the far field.

HRTFs are typically measured in an anechoic chamber to minimize the influence of early reflections and reverberation on the measured response. HRTFs are measured at small increments of θ such as 15° or 30° in the horizontal plane, with interpolation used to synthesize HRTFs for arbitrary positions of θ. Even with small increments, however, interpolation can lead to front-back confusion, and optimizing the interpolation procedure is an active area of research.

In order to maximize the signal-to-noise ratio (SNR) in a measured HRTF, it is important that the impulse being generated be of high volume. In practice, however, it can be difficult to generate impulses at high volumes and, if generated, they can be damaging to human ears, so it is more common for HRTFs to be directly calculated in the frequency domain using a frequency-swept sine wave or by using maximum length sequences. User fatigue is still a problem, however, highlighting the need for the ability to interpolate based on fewer measurements.

The head-related transfer function is involved in resolving the Cone of Confusion, a series of points where ITD and ILD are identical for sound sources from many locations around the "0" part of the cone. When a sound is received by the ear it can either go straight down the ear into the ear canal or it can be reflected off the pinnae of the ear, into the ear canal a fraction of a second later. The sound will contain many frequencies, so therefore many copies of this signal will go down the ear all at different times depending on their frequency (according to reflection, diffraction, and their interaction with high and low frequencies and the size of the structures of the ear.) These copies overlap each other, and during this, certain signals are enhanced (where the phases of the signals match) while other copies are canceled out (where the phases of the signal do not match). Essentially, the brain is looking for frequency notches in the signal that correspond to particular known directions of sound.

If another person's ears were substituted, the individual would not immediately be able to localize sound, as the patterns of enhancement and cancellation would be different from those patterns the person's auditory system is used to. However, after some weeks, the auditory system would adapt to the new head-related transfer function. The inter-subject variability in the spectra of HRTFs has been studied through cluster analyses.

Assessing the variation through changes between the person's ears, we can limit our perspective with the degrees of freedom of the head and its relation with the spatial domain. Through this, we eliminate the tilt and other co-ordinate parameters that add complexity. For the purpose of calibration we are only concerned with the direction level to our ears, ergo a specific degree of freedom. Some of the ways in which we can deduce an expression to calibrate the HRTF are:

1. Localization of sound in Virtual Auditory space
2. HRTF Phase synthesis
3. HRTF Magnitude synthesis A basic assumption in the creation of a virtual auditory space is that if the acoustical waveforms present at a listener's eardrums are the same under headphones as in free field, then the listener's experience should also be the same.

Typically, sounds generated from headphones appear to originate from within the head. In the virtual auditory space, the headphones should be able to "externalize" the sound. Using the HRTF, sounds can be spatially positioned using the technique described below.

Let $x_1(t)$ represent an electrical signal driving a loudspeaker and $y_1(f)$ represent the signal received by a microphone inside the listener's eardrum. Similarly, let $x_2(t)$ represent the electrical signal driving a headphone and $y_2(t)$ represent the microphone response to the signal. The goal of the virtual auditory space is to choose $x_2(t)$ such that $y_2(t)=y_1(t)$. Applying the Fourier transform to these signals, we come up with the following two equations:

$$Y_1=X_1LFM, \text{ and}$$

$$Y_2=X_2HM,$$

where L is the transfer function of the loudspeaker in the free field, F is the HRTF, M is the microphone transfer function, and H is the headphone-to-eardrum transfer function.

Setting $Y_1=Y_2$, and solving for $X_2$ yields: $X_2=X_1LF/H$.

By observation, the desired transfer function is: T=LFIH.

Therefore, theoretically, if $x_1(t)$ is passed through this filter and the resulting $x_2(t)$ is played on the headphones, it should produce the same signal at the eardrum. Since the filter applies only to a single ear, another one must be derived for the other ear. This process is repeated for many places in the virtual environment to create an array of head-related transfer functions for each position to be recreated while ensuring that the sampling conditions are set by the Nyquist criteria.

There is less reliable phase estimation in the very low part of the frequency band, and in the upper frequencies the phase response is affected by the features of the pinna. Earlier studies also show that the HRTF phase response is mostly linear and that listeners are insensitive to the details of the interaural phase spectrum as long as the interaural time delay (ITD) of the combined low-frequency part of the waveform is maintained. This is the modeled phase response of the subject HRTF as a time delay, dependent on the direction and elevation.

A scaling factor is a function of the anthropometric features. For example, a training set of N subjects would consider each HRTF phase and describe a single ITD scaling factor as the average delay of the group. This computed scaling factor can estimate the time delay as function of the direction and elevation for any given individual. Converting the time delay to phase response for the left and the right ears is trivial.

The HRTF phase can be described by the ITD scaling factor. This is in turn is quantified by the anthropometric data of a given individual taken as the source of reference. For a generic case we consider β as a sparse vector $$\beta=[\beta_1, \beta_2, \ldots, \beta_N]^T$$

that represents the subject's anthropometric features as a linear superposition of the anthropometric features from the training data ($y'=\beta_T X$), and then apply the same sparse vector directly on the scaling vector H. We can write this task as a minimization problem, for a non-negative shrinking parameter λ:

$$\beta = \underset{\beta}{\operatorname{argmin}}\left(\sum_{n=1}^{A}\left(y_a - \sum_{n=1}^{N}\beta_n X_n^2\right) + \lambda\sum_{n=1}^{N}\beta_n\right)$$

From this, ITD scaling factor value H' is estimated as:

$$H' = \sum_{n=1}^{N}\beta_n H_n.$$

where the ITD scaling factors for all persons in the dataset are stacked in a vector $H\in R^N$, so the value $H^n$ corresponds to the scaling factor of the n-th person.

We solve the above minimization problem using Least Absolute Shrinkage and Selection Operator (LASSO). We assume that the HRTFs are represented by the same relation as the anthropometric features. Therefore, once we learn the sparse vector β from the anthropometric features, we directly apply it to the HRTF tensor data and the subject's HRTF values H' given by:

$$H'_{d,k} = \sum_{n=1}^{N}\beta_n H_{n,d,k}$$

where the HRTFs for each subject are described by a tensor of size D×K, where D is the number of HRTF directions and K is the number of frequency bins. All $H_{n,d,k}$ corresponds to all the HRTFs of the training set are stacked in a new tensor $H\in R^{N\times D\times K}$, so the value $H_{n,d,k}$ corresponds to the k-th frequency bin for dth HRTF direction of the n-th person. Also $H'_{d,k}$ corresponds to kth frequency for every d-th HRTF direction of the synthesized HRTF.

Recordings processed via an HRTF, such as in a computer gaming environment, such as with A3D, EAX and OpenAL, which approximates the HRTF of the listener, can be heard through stereo headphones or speakers and interpreted as if they comprise sounds coming from all directions, rather than just two points on either side of the head. The perceived accuracy of the result depends on how closely the HRTF data set matches the physiological structure of the listener's head/ears.

SUMMARY OF THE INVENTION

An audio spatialization system is desirable for use in connection with a personal audio playback system such as headphones, earphones, and/or earbuds. The system is intended to operate so that a user can customize the audio information received through personal speakers. The system is capable of customizing the listening experience of a user and may include at least some portion of the ambient audio or artificially-generated position specific audio. The system may be provided so that the audio spatialization applied may maintain orientation with respect to a fixed frame of reference as the listener moves and tracks movement of an actual or apparent audio source even when the speakers and sensor are not maintained in the same relative position and orientation to the listener. For example, the system may operate to identify and isolate audio emanating from a source located in a particular position. The isolated audio may be provided through an audio spatialization engine to a user's personal speakers maintaining the same orientation. The system is designed so that the apparent location of audio from a set of personal speakers can be configured to remain constant when a user and/or the sensors turn or move. For example, if the user turns to the right, the personal speakers will turn with the user. The system may apply a modification to the spatialization so that the apparent location of the audio source will be moved relative to the user, i.e., to the user's left and the user will perceive the audio source remaining stationary even while the user is moving relative to the source. This may be accomplished by motion sensors detecting changes in position or orientation of the user and modifying the audio spatialization in order to compensate for the change in location or orientation of the user, and in particular the ear speakers being used. The system may also use audio source tracking to detect movement of the audio source and to compensate so that the user will perceive the audio source motion.

In one use case, an augmented reality video game may be greatly enhanced by addition of directional audio. For example, in an augmented reality game, a game element may be assigned to a real world location. A player carrying a smart phone or personal communication device with a GPS or other position sensor may interact with game elements using application software on the personal communication device when in proximity to the game element. According to an embodiment of the disclosed system, a position sensor in fixed orientation with the users head may be used to control specialization of audio coordinated with the location assigned to the game element.

In one use case, a user may be listening to music in an office, in a restaurant, at a sporting event or in any other environment in which there are multiple people speaking in various directions relative to the user. The user may be utilizing one or more detached microphone arrays or other sensors in order to identify and, when desired, stream certain sounds or voices to the user. The user may wish to quickly turn in the direction relative to the user from where the desired sound is emanating or from where the speaker is standing in order to show recognition to the speaker that he/she is heard and to focus visually in the direction of such sound source. The user may be wearing headphones, earphones, a hearable or assisted listening device incorporating or connected to a directional sensor, along with an ability to accurately reproduce sounds with a directional element (a straightforward function of such direction is to the left or right of a user, or a more complex function utilizing a 3D technology or spatial engine such as Realsound3D from Visisonics if the sound is from the front, back, or a different elevation relative to the user.) According to an embodiment of the disclosed system, a position sensor in the external microphone array or sensor will synchronize with the position sensor of the user, thus enabling the user to hear the sounds in the user's ears as though the external sensor was being worn, even as it is detached from the user.

An audio source signal may be connected to the audio spatialization system. The motion sensor associated with the personal speaker system may be connected to a listener position/orientation unit having an output connected to the audio spatialization engine representing position and orientation of the personal speaker system. The audio spatialization engine may add spatial characteristics to the output of the audio source on the basis of the output of the listen position/orientation unit and/or directional cues obtained from a directional cue reporting unit.

An audio customization system may be provided to enhance a user's audio environment. An embodiment of the system may be implemented with a sensor (microphone) array that is not in a fixed location/direction relative to personal speakers.

It is an object to apply directional information to audio presented to a personal speaker such as headphones or earbuds and to modify the spatial characteristics of the audio in response to changes in position or orientation of the personal speaker system and/or audio sensors. The audio spatialization system may include a personal speaker system with an input of an electrical signal which is converted to audio. An audio spatialization engine output is connected to the personal speaker system to apply a spatial or directional component to the audio being output by the personal speaker system. The directional cue reporting unit may include a location processor in turn connected to a beamforming unit, a beam steering unit and directionally discriminating acoustic sensor associated with the personal speaker system. The directionally discriminating acoustic sensor may be a microphone array. The association between the directionally discriminating acoustic sensor and the personal speaker system is such that there is a fixed or a known relationship between the position or orientation of the personal speaker system and the directionally discriminating acoustic sensor. A motion sensor also is arranged in a fixed or known position and orientation with respect to the personal speaker system. The audio spatialization engine may apply head related transfer functions to the audio source.

An audio spatialization system may include a personal speaker system with an input representative of an audio input and an audio spatialization engine having an output representative of the audio output of the personal speaker system. An audio source having an output may be connected to the audio spatialization engine. A motion sensor may be associated with the personal speaker system. A listener position orientation unit may have an input connected to the motion sensor and an output connected to the audio spatialization engine representing the position and orientation of the personal speaker system. The audio spatialization engine may add spatial characteristics to the output of the audio source on the basis of the output of the listener position/orientation unit. The audio spatialization system may include a directional cue reporting unit having an output representative of a direction connected to the audio spatialization engine. The audio spatialization engine may add spatial characteristics to the output of the audio source on the added basis of the output representative of a direction of the directional cue reporting unit. The directional cue reporting unit may include a location processor connected to a beamforming unit; a beam steering unit and a directionally discriminating acoustic sensor associated with the personal speaker system. The directionally discriminating acoustic sensor may be a microphone array. The motion sensor may be an accelerometer, a gyroscope, and/or a magnetometer. The audio spatialization engine may apply head related transfer functions to the output of the audio source.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF PREFERRED EMBODIMENTS

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise. For the sake of clarity, D/A and ND conversions and specification of hardware or software driven processing may not be specified if it is well understood by those of ordinary skill in the art. The scope of the disclosures should be understood to include analog processing and/or digital processing and hardware and/or software driven components.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Figure 1:
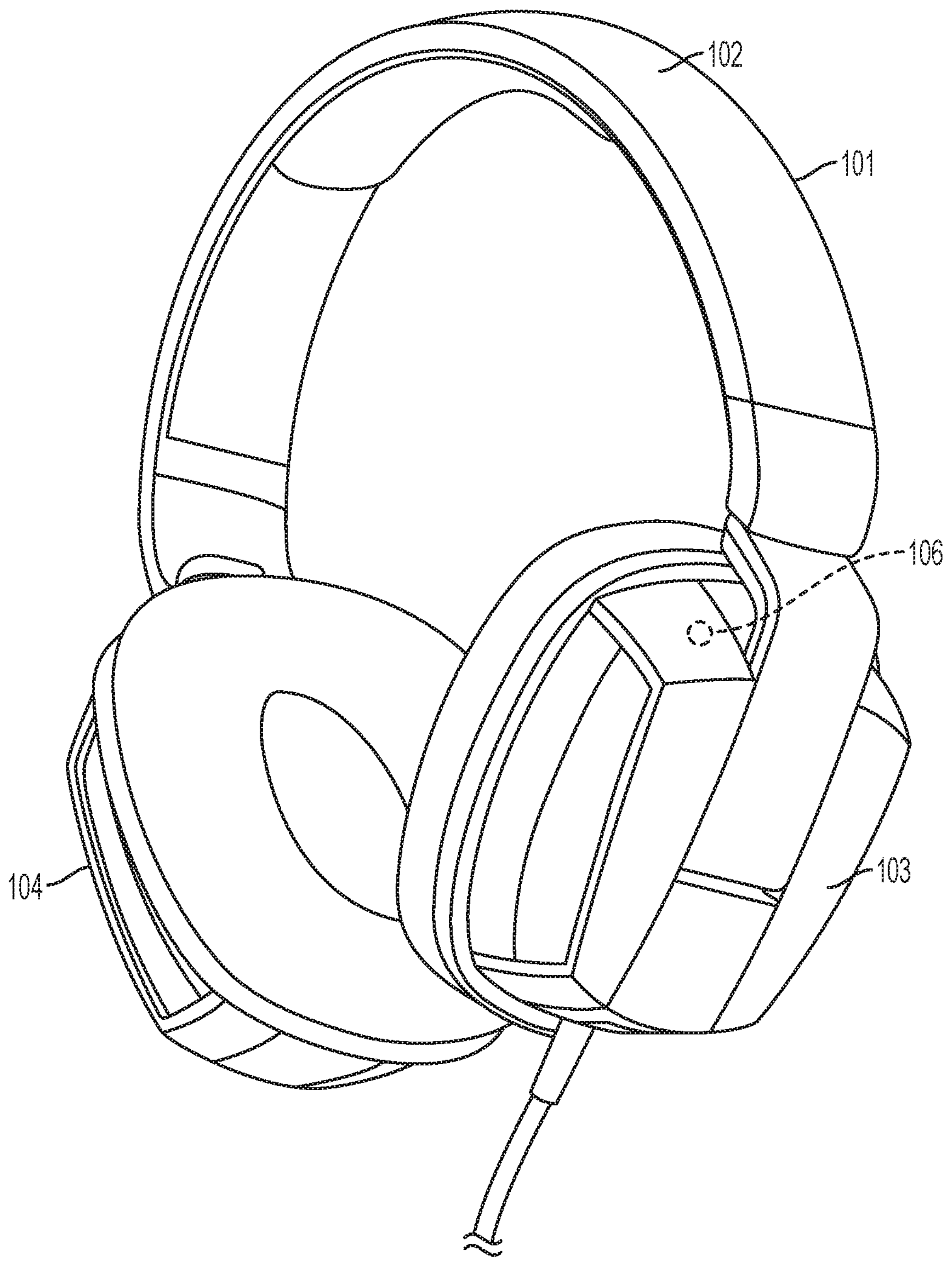
FIG. 1 shows a pair of headphones with an embodiment of a microphone array.

FIG. 1 shows a pair of headphones which may be used in the system.

The headphones 101 may include a headband 102. The headband 102 may form an arc which, when in use, sits over the user's head. The headphones 101 may also include ear speakers 103 and 104 connected to the headband 102. The ear speakers 103 and 104 are colloquially referred to as "cans."

A position sensor 106 may be mounted in the headphones, for example, in an ear speaker housing 103 or in a headband 102 (not shown). The position sensor 106 may be a 9-axis position sensor. The position sensor 106 may include a magnometer and/or an accelerometer.

Figure 2:
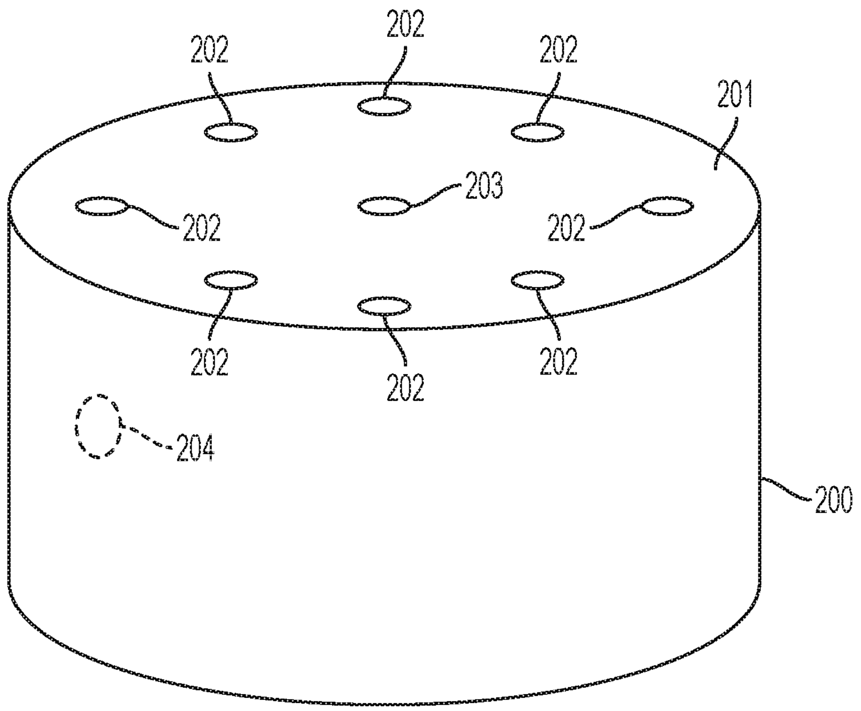
FIG. 2 shows a portable microphone array.

FIG. 2 shows a portable microphone array. The portable microphone array may be contained in a housing 200. The configuration of the housing is not important to the operation. The housing may be a freestanding device. Alternatively, the housing 200 may be part of a personal communications device such as a cell phone or smart phone. The housing may be portable. The housing 200 may include a cover 201. A plurality of microphones 202 may be arranged on the cover 201. The plurality of microphones 202 may be positioned with any suitable geometric configuration. A linear arrangement is one possible geometric configuration. Advantageously, the plurality of microphones 202 may include three (3) or more non-co-linear microphones. Non-co-linear arrangement of three or more microphones is advantageous in that the microphone signals may be used by a beamformer for unambiguous determination of direction of arrival of point-generated audio.

According to an embodiment, eight (8) microphones 202 may be provided which are equally spaced and define a circle. A central microphone 203 may also be provided to facilitate accurate source direction of arrival. The portable microphone array may also include a position sensor 204. The position sensor may be a 9-axis position sensor. The position sensor 205 may include an absolute orientation sensor such as a magnometer.

Figure 3:
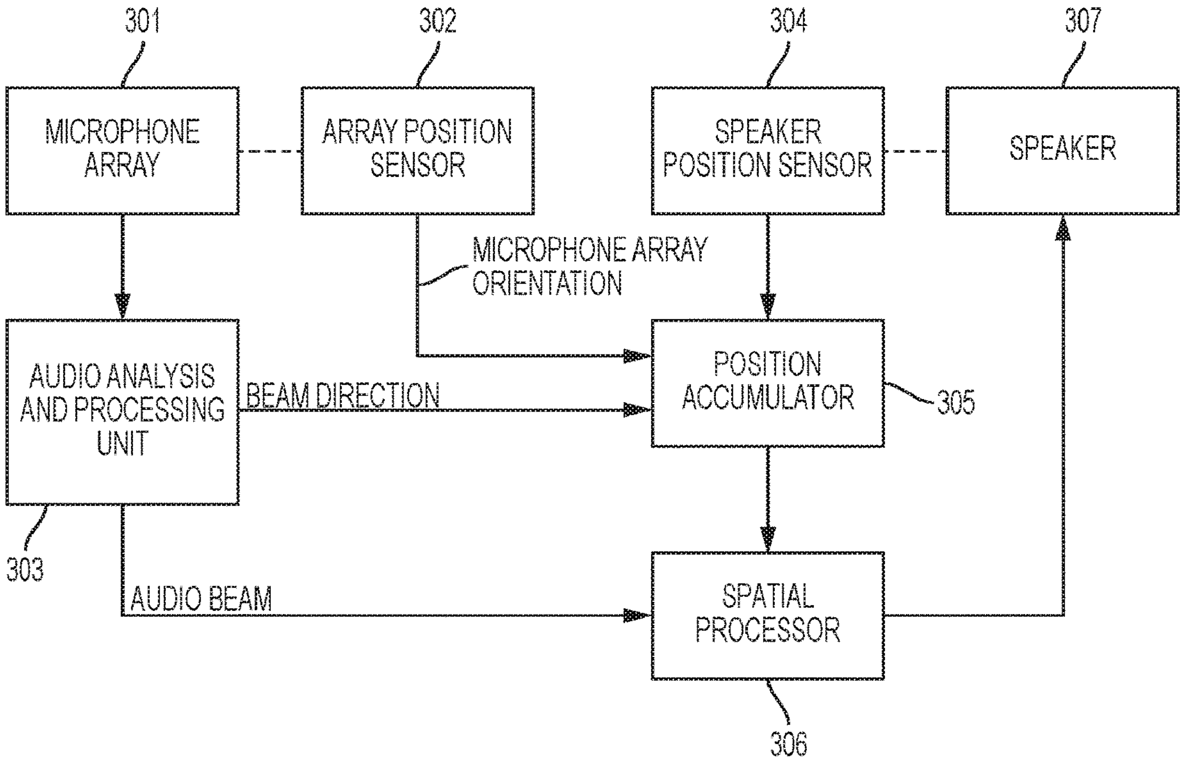
FIG. 3 shows a spatial audio processing system.

FIG. 3 shows a spatial audio processing system. The spatial audio processing system of FIG. 3 may operate on the assumption that the microphone array 301 is located in close proximity to the speakers 307 and the point audio source is located in a position that is not between the microphone array 301 and speakers 307. A microphone array 301 may provide a multi-channel signal representative of the audio information sensed by multiple microphones to an audio analysis and processing unit 303. An array position sensor 302 is fixably-linked to a microphone array 301 and generates a signal indicative of the orientation of the microphone array 301. The audio analysis and processing unit 303 operates to generate one or more signals representative of one or more audio beams of interest. An example of an audio analysis and processing unit is described in co-pending U.S. patent application Ser. No. 15/355,822 entitled, "Audio Analysis and Processing System", filed on even date herewith and expressly incorporated by reference herein.

The audio analysis and processing unit may generate a signal corresponding to the audio beam direction which is connected to the position accumulator 305. The audio analysis and processing unit may use a beamformer to select a beam which includes audio information of interest or may include beam-steering capabilities to refine the direction of arrival of audio from an audio source.

The speaker position sensor 304 may be fixed to speakers 307 and may generate a signal indicative of the speaker position. The signal indicative of the speaker position may be an absolute orientation signal such as may be generated by a magnometer. The speaker position sensor 304 may utilize gyroscopic and/or inertial sensors. The position accumulator 305 has inputs indicative of the microphone array orientation, the speaker orientation in the beam direction. This information is combined in order to determine the proper apparent direction of arrival of the audio information relative to the speaker position. The speaker 307 may be a personal speaker in fixed orientation relative to the user, for example, headphones or earphones. A spatial processor 306 may be provided to impart spatialization to the signal representing the audio beam. The spatial processor 306 may have an output which is a binaural spatialized audio signal connected to the speaker 307 which may be binaural speakers. The spatial processor 306 may apply a head-related transfer function to the signal representing the audio beam and generate a binaural output according to the direction determined by the position accumulator 305.

Figure 4:
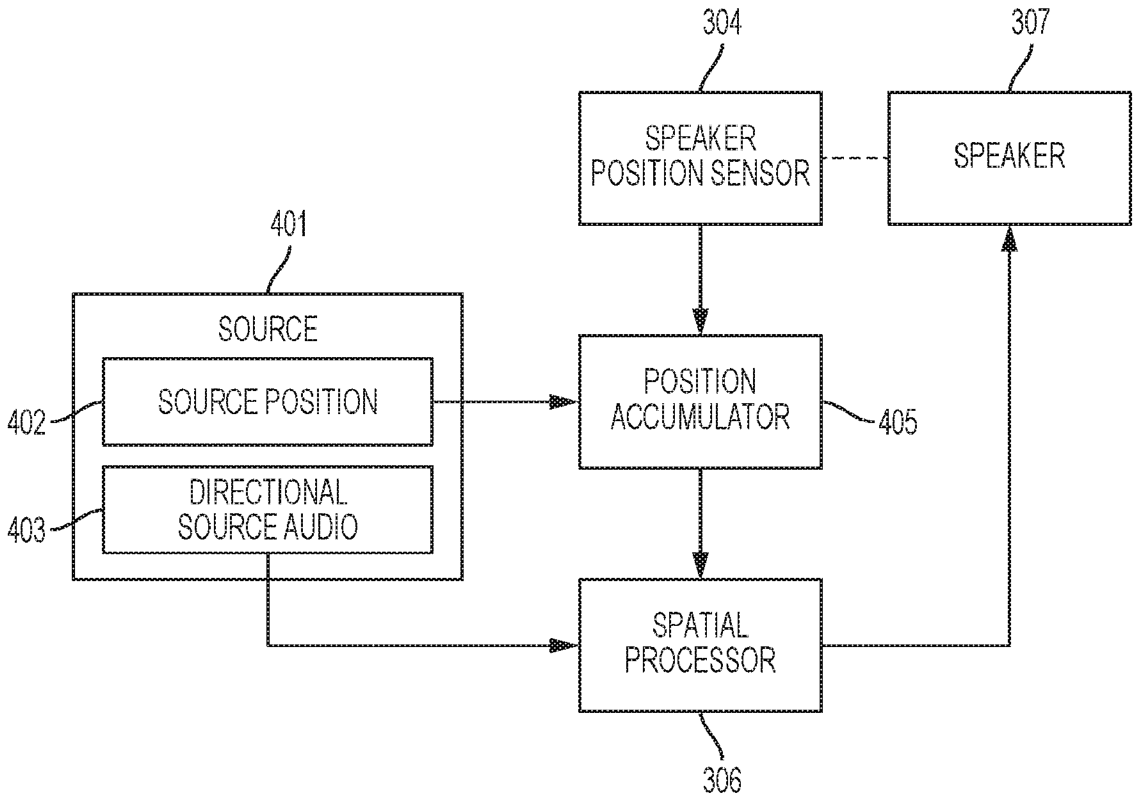
FIG. 4 shows a spatial audio processing system which may be used with non-ambient source information.

FIG. 4 shows a spatial audio processing system which may be used with non-ambient source information. The non-ambient source information may, for example, be used in augmented reality or virtual reality systems which are arranged to provide personal speakers with spatialized audio information. Elements in FIG. 4 which correlate to elements in FIG. 3 have been given the same reference numbers. An audio source system 401 may be a video game or other system which generates audio having a positional or directional frame of reference not fixed to the orientation of a personal speaker system 307. The directional source information system includes a source position 402 output provided to a position accumulator 405. The unit 401 also provides an audio output 403 which is intended to have an apparent direction of arrival indicated by source position 402. A position accumulator 405 receives a signal indicative of the orientation of the speaker position sensor 304, and a signal indicative of the intended orientation of direction of arrival of the source position 402. The position accumulator 405 generates a signal indicative of the direction of arrival referenced to the orientation of the speakers 307. The spatial processor 306 spatializes the directional source audio 403 in accordance with the output of the position accumulator 405 and has an output of a spatialized binaural signal having the proper orientation, connected to speakers 307.

According to an example, a personal speaker system may be oriented in a north facing direction. If a microphone array is oriented in an east facing direction and the direction of arrival of an audio signal is 45° off of the facing direction of the microphone array, the position accumulator receives a signal representative of each orientation, namely 0° for north, 90° for east and 45° for the direction of arrival for a total of 135° (90-0+45) for the orientation of the apparent audio source relative to the orientation of the speakers.

In an example of an augmented reality system, if a game element is located northeast of a speaker position sensor and the orientation of the speaker is facing southeast of the spatialization applied to an audio signal associated with the game element is 45° (SE)−135° (NE)=−90°.

According an advantageous feature, a motion detector such as Gyroscope, and/or a compass may be provided in connection with a microphone array. Because the microphone array is configured to be carried by a person, and because people move, a motion detector may be used to ascertain change in position and/or orientation of the microphone array.

The techniques, processes and apparatus described may be utilized to control operation of any device and conserve use of resources based on conditions detected or applicable to the device.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An audio spatialization system comprising:

a directional cue reporting unit having an output signal representative of a position of an audio source;

a listener position orientation unit having a first input connected to a signal corresponding to a user position and orientation and a second input connected said directional cue reporting unit output signal representative of an audio source wherein said listener position orientation unit combines said first input with said second input and generates an output signal representing an intended audio signal direction of arrival of said audio signal relative to said user position and orientation;

an audio spatialization engine having a first input connected to an audio signal corresponding to said audio source and a second input connected to said output signal representing an intended direction of arrival of said audio signal relative to said user position and orientation and wherein said audio spatialization engine generates a spatialized audio output.

2. The audio spatialization system according to claim 1 wherein said directional cue reporting unit further comprises a location processor connected to a beamforming unit; a beam steering unit and a directionally discriminating acoustic sensor associated with a personal speaker system.

3. The audio spatialization system according to claim 2 wherein said directionally discriminating acoustic sensor is a microphone array.

4. The audio spatialization system according to claim 3 wherein said audio spatialization engine applies head related transfer functions to said audio signal.

5. The audio spatialization system according to claim 1 wherein said audio signal is a generated audio signal.

6. The audio spatialization system according to claim 1 wherein said audio signal to said audio spatialization engine is derived from ambient audio detected by an audio sensor.

7. The audio spatialization system according to claim 1 wherein said listener position and orientation unit updates said output representing an intended direction of arrival of said audio signal relative to said user position and orientation.

8. The audio spatialization system according to claim 1 wherein said audio spatialization engine is connected to an augmented reality game.

* * * * *